Sept. 11, 1962 W. S. LARSON ET AL 3,053,726
JOINING THERMOPLASTIC SECTIONS
Filed May 18, 1959

INVENTORS
WESLEY S. LARSON
JACK P. QUALEY

BY Chapin & Neal

ATTORNEYS

United States Patent Office 3,053,726
Patented Sept. 11, 1962

3,053,726
JOINING THERMOPLASTIC SECTIONS
Wesley S. Larson, Hazardville, Conn., and Jack P. Qualey, Frederick, Md., assignors to De Bell & Richardson, Inc., Hazardville, Conn., a corporation of Massachuetts
Filed May 18, 1959, Ser. No. 813,937
3 Claims. (Cl. 156—304)

This invention relates to the butt-welding or the heat sealing together at their edges, of thermoplastic members, such as thin molded wall sections or extruded or otherwise formed sheets, where the wall or sheet thickness of the members or the orientation of the material of which they are formed have heretofore rendered such joining of the members difficult, if not impossible from the commercial point of view.

In general under prior practice acceptable butt-welding of thermoplastic members having a wall or sheet thickness materially below 40 mils, or even at or above that figure, if the material is highly oriented, has not been achieved with the accuracy and reliability needed for commercial purposes.

Where the wall or sheet thickness is substantially below 40 mils the difficulties of aligning and maintaining the alignment of the members to be joined are substantial and when the material is oriented the resulting "memory" causes the material to warp and deform as the internal stresses are relaxed upon the application of heat. This tendency to distortion increases with the thinness of the section.

Where the wall thickness is substantial, as in pipe sections for example, distortion is slight and pipe sections are butt-welded without substantial difficulty but in thin walled tubing, thin walled molded members, or thin sheets butt-welding has not been found practical.

It is the principal object of this invention to provide ways and means for reliably and accurately butt-welding, heat sealing or joining the edges of thermoplastic members together in edge to edge relation where the orientation of the material or the wall or sheet thickness of the members, or a combination of these factors, preclude the use of conventional procedures.

Other and further objects and advantages of the invention will be apparent from the disclosures of the accompanying drawing and the following specification and claims.

In general the objects of the invention are attained by providing the edge portions of the members to be joined with offset flange portions which have a surface continuous with that of the edge faces to be joined and which are of sufficient volume to resist distortion when subjected to a welding heat, all as later fully described. Preferably and for reasons later given these flange portions will be provided at their outer edges with rearwardly extending portions spaced from the adjacent surface of the members.

Figure 1:
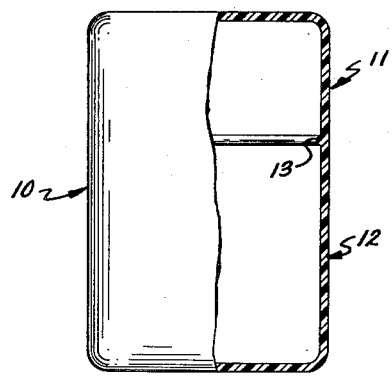
FIG. 1 is an elevational view, partly in section, of a closed container, formed of two parts, joined in accordance with the invention.
Figure 2:
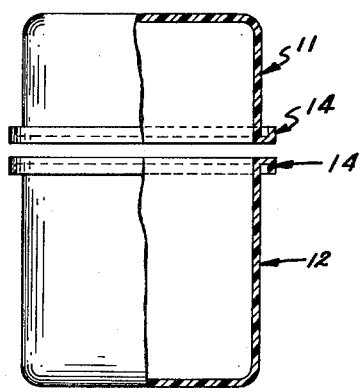
FIG. 2 is a view similar to FIG. 1 showing the members prior to joining.

Referring to FIG. 1 a closed, generally cylindrical container formed of thermoplastic material is generally indicated at 10, and is shown as comprising two members 11 and 12 welded together as at 13. For purposes of clearness the wall thickness of the members is shown greatly exaggerated and would in general be substantially below 40 mils. In FIG. 2 the members 11 and 12 are shown prior to welding and are each provided, in accordance with the invention, with outwardly offset flanges as generally indicated at 14.

Figure 3:
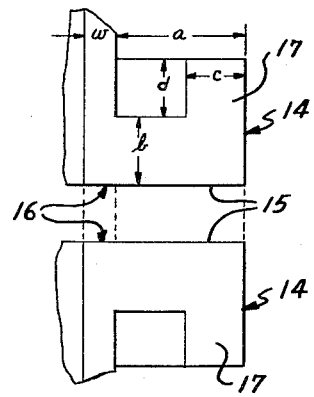
FIG. 3 is a diagrammatic detail view on a larger scale showing the flange formation at the edges of the members of FIG. 2.

As best shown in FIG. 3 the flanges 14 have surfaces 15 which are continuous with the faces 16 of the edges of the members to be joined, the latter being commensurate with the wall thickness $w$. The surfaces 15 and 16 form a single surface having a substantially greater area or extent than would the faces 16 in the absence of the flanges. The flanges are so dimensioned at $a$, $b$, $c$ and $d$ as to provide a volume of material which is adequate to resist and prevent distortion due to the release of orientation strains relieved when a softening or welding heat is applied to the surfaces 15—16. This "memory" distortion which would in the absence of the flanges 14 prevent conformable engagement of the edge faces 16 is more energetic and destructive the smaller the wall thickness $w$ so that the thinner the wall thickness the greater the volume needed in the flanges. The flange dimensions which require consideration in this respect are those indicated at $a$ and $b$ in FIG. 3, disregarding that portion of the flange 17 represented by the dimensions $c$ and $d$. Given the concept of the invention the proper dimensions $a$ and $b$ are easily empirically determined but in general and for practical purposes the dimensions $a$ and $b$ will each, at least, equal $2w$, and may exceed that amount to any extent otherwise found desirable.

Preferably and as shown the flange includes the rearwardly extending portion 17.

Figure 5:
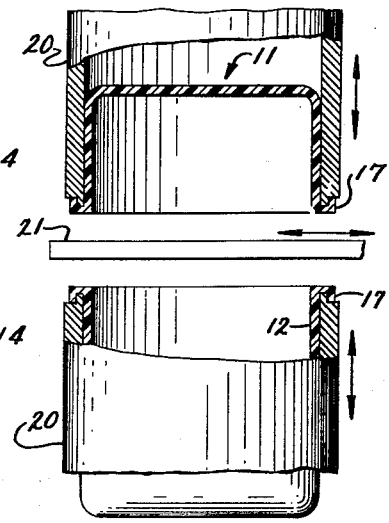
FIG. 5 is a generally diagrammatic view illustrating means for carrying out the welding step.

The joining of the two portions of a hollow member such as the portions 11 and 12 of FIG. 2, are accomplished by seating them in the open ends of opposed, aligned, cylindrical press members 20, FIG. 5, mounted for movement toward and from each other, as indicated by arrows, by any suitable means, not shown. As shown in the latter figure the portions 17 of the flanges 14 extend rearwardly along the outer faces of the press members 20 and are provided for the purpose of holding the side walls of the members 11 and 12 against the inner faces of the press members and the edge face portions of the members 11 and 12 in exact alignment as they are heated and pressed together.

Figure 4:
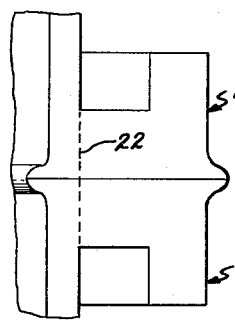
FIG. 4 is a view similar to FIG. 3 showing subsequent steps in the joining operation.

The edge faces of members 11 and 12 are preferably heated by bringing the press members into closely spaced relation and inserting a heated member, generally indicated at 21, therebetween with the edge portions of members 11 and 12 in sufficiently close proximity thereto to raise the temperature of such portions to a welding or sealing temperature not materially above the minimal. Member 21 is then withdrawn and the press member 20 immediately moved toward each other to press the edge portions of members 11 and 12 into engagement with only sufficient pressure to effect their welding together, as diagrammatically shown in FIG. 4. It will be understood that after the welding operation is accomplished press members 20 are separated and the article ejected therefrom in any suitable manner. Thereafter the flanges 14 may be completely or partially cut off to leave the outer surface of the article continuous and with the desired smoothness, as indicated by dotted line 22 in FIG. 4. Alternatively the free edges of press members 20 may be provided with suitable cutting or "pinching off" edges and the removal of the flanges accomplished by moving the members 20 into contact with each other after a suitable interval.

As previously stated the invention is applicable to the butt joining of various forms of moldings, tubing and sheets and it will be understood that the press members will conform to the needs of the members or parts being jointed.

What is claimed is:

1. The method of butt-joining thin walled sections of stiff thermoplastic material which comprises the steps of forming, simultaneously with the formation of the sections, respective flanges extending outwardly from the end portions of the section walls to be joined, controlling the distribution of the plastic material as the flanges are formed to provide each with a surface continuous and coplanar with the end surface of the section wall from which it extends and a thickness sufficiently greater than that of the wall from which it extends to provide a distortion resisting bulk of material above said coplanar surfaces of the flange and section wall, thereafter positioning the sections to be joined with their said respective surfaces in spaced abuttable alignment, simultaneously heating said surfaces to a temperature not materially above the minimal welding temperature of the material, immediately pressing said surfaces together under pressure only sufficient to effect a welded juncture by means of applying pressure to the flanges and having a surface in engagement with the adjacent section wall.

2. The method recited in claim 1, said flange portions being provided with a rearward extension engaging a surface of the pressure applying means opposite that in engagement with the wall of the section.

3. The method recited in claim 1, the extent of the flange portions outwardly of the wall, and the thickness of said flange portions being at least twice the thickness of the wall.

References Cited in the file of this patent

UNITED STATES PATENTS

| | | |
|---|---|---|
| 1,601,029 | Ligonnet | Sept. 28, 1926 |
| 1,921,623 | Leguillon | Aug. 8, 1933 |
| 2,384,014 | Cutter | Sept. 4, 1945 |
| 2,746,774 | Nielsen | May 22, 1956 |